United States Patent [19]

Munoz et al.

[11] 4,446,177
[45] May 1, 1984

[54] REINFORCED PLASTIC PRODUCT

[76] Inventors: George L. Munoz, 11352 James Grant, El Paso, Tex. 79936; William J. Munoz, Lo 200 Sumatra, El Paso, Tex. 79925

[21] Appl. No.: 357,685

[22] Filed: Mar. 12, 1982

[51] Int. Cl.³ ............................................. B44F 9/04
[52] U.S. Cl. ....................................... 428/15; 428/35; 428/287; 428/483
[58] Field of Search ............... 428/15, 35, 287, 483; 52/DIG. 7

[56] References Cited

U.S. PATENT DOCUMENTS

| | | | |
|---|---|---|---|
| 2,255,313 | 9/1941 | Ellis | 525/508 X |
| 2,978,340 | 4/1961 | Veatch et al. | 264/42 X |
| 3,050,785 | 8/1962 | Cunningham | 428/15 X |
| 3,396,067 | 8/1968 | Schafer | 428/15 X |
| 3,433,860 | 3/1969 | Ruggles et al. | 428/15 X |
| 3,562,379 | 2/1971 | Duggins | 428/15 X |
| 3,585,094 | 6/1971 | Ruggles | 428/15 X |
| 3,634,179 | 1/1972 | Anderson | 428/187 X |
| 3,773,886 | 11/1973 | Starr et al. | 428/15 X |
| 4,126,719 | 11/1978 | Koyanagi et al. | 428/15 X |
| 4,235,948 | 11/1980 | Holmes | 428/15 |
| 4,248,816 | 2/1981 | Sheridan | 428/15 X |

*Primary Examiner*—Henry F. Epstein
*Attorney, Agent, or Firm*—Lowe, King, Price & Becker

[57] ABSTRACT

A simulated stone product is formed of a reinforced plastic including a gelcoat layer, a thermoplastic or thermoset resin matrix and a backup layer. The gelcoat layer is composed of a thermoplastic or thermoset resin and plasticizer. The matrix includes fillers, colorants and plasticizers dispersed therein and is laid up on the inner side of the gelcoat layer. The backup layer is comprised of a fibrous polyester sheet impregnated with thermoplastic or thermoset resin and plasticizer. The fibers used in the fibrous sheet may be woven or nonwoven, and are preferably of a polyester material. The backup layer is laid up on the matrix layer. The matrix layer and backup layer may each include microspheres.

19 Claims, 1 Drawing Figure

REINFORCED PLASTIC PRODUCT

FIELD OF THE INVENTION

This invention relates to a resinous product simulating stone in the form of cast slabs, panels and other units useful in the building arts and a process for forming such product.

DESCRIPTION OF THE PRIOR ART

Various processes for the production of simulated or synthetic stone from resinous products such as marble, onyx and slate have been developed and extensively used commercially. Some of these processes employ a colored veining material, such as a pigment mixed with a polyester resin which is then mixed with an epoxy or polyester type resin highly filled with calcium carbonate to produce in random fashion a "cultured" marble upon cure. Examples of some of the prior art using such procedures are disclosed in U.S. Pat. Nos. 3,050,785, 3,433,860 and 3,562,379. These products are usually cast so as to form washbasins, countertops and the like. There have been attempts to use such prior art processes for making larger structures, such as, bathtubs, shower stalls, hot tubs, stationary sinks, etc. but they have not proved to be successful. One problem with large structures made by prior art processes is that they are extremely heavy and thus difficult to fabricate and transport. Further, large quantities of resin required to make such a structure substantially increase the price. Another disadvantage associated with large structures made under prior art processes is that they are fragile and temperature sensitive, which may cause shattering, warping and other problems under certain conditions particularly with planar shapes such as panels or sheets.

Other processes have attempted to overcome these problems. Several such prior art teachings are shown in U.S. Pat. Nos. 3,773,886 and 4,248,816 where a plurality of layers of polyester compositions are utilized including a rubbery polymeric material producing elongated striations. These patented processes involve spraying long coherent streams of a special veining composition on the prepared surface of a mold, spraying a discontinuous coating of the spatter composition over the thus-veined mold surface and filling the thus-coated mold with a matrix base material such as a highly filled polyester resin. However, these attempts have not proved to be entirely successful because of adhesion problems between the various layers and especially between the simulated stone matrix layer and the synthetic resin sheet.

U.S. Pat. No. 4,235,948 discloses a process which attempts to overcome the aforementioned delamination problems by providing a method comprising applying to a preformed acrylic sheet a coating of liquid urethane, applying to the urethane coating a matrix composition including a catalyzed polyester bonding resin, a simulated stone aggregate, pigmenting agents and an exothermic reducing agent such as alpha-methyl styrene for slowing the setting time of the polyester bonding resin to improve the bonding between the urethane layer coating the acrylic sheet and the simulated stone matrix (polyester layer). However, the long manufacturing time (6½ hours) and a rigid final product are distinct disadvantages.

U.S. Pat. No. 4,126,719 discloses a four layer system having decorative surface designs resembling marble, onyx and the like. The patent product comprises (1) a gelcoat of clear thermosetting resin, (2) an extremely thin printed fabric (woven or nonwoven) made of glass fiber or polyester fiber and impregnated with a clear thermosetting resin, for the sole purpose of imparting veins or striations, (3) a background composed of a thermosetting resin having inorganic pigment dispersed therein and (4) a layer of fiber reinforced plastic material. This process has two drawbacks. The four layer system adds to production and material costs and the final product is not as realistic as could be desired for a superior simulated or cultured marble product.

The above patents all relate to processes which have a number of shortcomings. Thus, there has been a long felt need for a process which is relatively fast, simple, i.e. can be produced with minimal technical skill, economical and which can be used to make even large structures having a simulated marble or onyx appearance.

SUMMARY OF THE INVENTION

The present invention provides a reinforced plastic product, preferably an article resembling a synthetic stone such as slate and most preferably a simulated or cultured marble or onyx product. The final product is flexible, lightweight, resilient, with greatly enhanced strength, durability and impact resistance and overcomes the problems of brittleness, rigidity, and warpage associated with prior art products. In addition, the product of the present invention does not require the use of as much resin or the production time as associated with prior art processes. Most importantly, these advantages are achieved without sacrificing the asthetics of the product. Also, the process of the present invention employs certain compositions which can be spray applied.

In accordance with the present invention a reinforced plastic product comprises: a gelcoat comprised of substantially clear thermoset resin, a matrix layer having veins of opaque filler comprising a mixture of filler, colorants such as pigments and dyes, plasticizers, and thermoset resin and catalyst laid up on the inner side of the gelcoat layer; and a woven or nonwoven polyester fiber sheet impregnated with a mixture of thermoplastic resin, plasticizers, and colorants. In a preferred embodiment microspheres are added to the second and third layers.

After final curing of the various layers a sandwich construction of the thermoset resin layer/matrix layer/impregnated polyester fiber sheet layer is formed. This sandwich construction provides high strength-to-weight ratios which enables the resin layers to be made thinner without sacrificing mechanical strength characteristics.

Accordingly, one primary object of the present invention is to provide a novel and improved building product with predetermined appearance and structure, preferably similar to natural stone such as slate, marble or onyx yet capable of an infinite number of variations each of which can be controlled on a commercial scale.

It is another object of the invention to provide a simple, effective, reliable and economical process for manufacturing the product of the invention.

A further object is to provide a reinforced plastic product that is light and flexible yet has the strength properties which enables its use for large structures.

A still further object of the present invention is to provide a synthetic slate, marble or onyx product essentially indistinguishable in appearance from the natural product.

Yet a further object is to make the reinforced plastic product of this invention in the form of flat sheets or panels.

The novel features, which are believed to be characteristic of this invention, both as to its organization and method of operation, together with further objectives and advantages thereof will be better understood from the following description considered in connection with the accompanying drawings in which a presently preferred embodiment is illustrated by way of example. It is to be expressly understood, however, that the drawing is for the purpose of illustration and description only, and is not intended as definition of the limits of invention.

DETAILED DESCRIPTION OF THE PREFERRED EMBODIMENT

Figure 1:
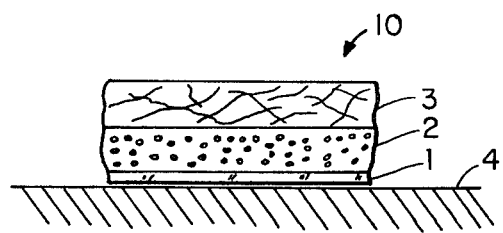
FIG. 1 is an enlarged fragmentary cross-sectional view of a portion of the article according to this invention.

Broadly, the present invention is directed to a novel reinforced plastic product and the process for its manufacture. Particularly, the invention relates to a simulated stone such as slate, cultured marble or onyx article and to a composition for and method of making the same. More particularly, this invention pertains to the method of producing substantially flat sheets or panels from such compositions. The so produced sheet or panel can be fabricated or heat molded into building structures such as columns or blocks, lavatories, bathtubs, tabletops, countertops, window sills, boat hulls and the like.

Referring to FIG. 1, a cross-section of a final simulated stone material 10 produced by the method of the present invention is shown. A mold 4, used to make the final product 10, is coated with a clear resin film 1 referred to herein as a gelcoat; a matrix layer 2 comprising a decorative or veining component laid up on the inner side of the gelcoat; and a backing layer 3 comprising a polyester fiber sheet saturated with a thermoset resin and plasticizer are also shown. In making the final product 10, it may be desirable to coat the mold with a conventional release agent before application of the gelcoat, for example, carnauba wax, silicones or other similar mold release materials may be used to coat the mold 4. It should be understood that the use of resin gelcoats is well recognized in the art. Typically, the gelcoat is a clear, curable polyester resin which is applied to the mold by means of a spray gun, brush or the like.

In accordance with the process of the present invention, the clear thermoplastic gelcoat film 1 preferably has a thickness of about 0.127 to 0.908 mm and 0.254 to 0.908 mm in the preferred range. If the thickness of the gelcoat film is much greater than 0.635 mm, the film has a tendency to discolor and turn yellow. On the other hand if film thickness is less than about 0.127 mm, the film will have a tendency to adhere to the adjacent layer and may be adversely affected by the color veining herein below discussed in greater detail.

While a wide variety of substantially clear or transparent thermosetting resins such as acrylic resins, vinyl ester resins, epoxy resins and other resins which are resistant to hot water are available as gelcoats for the present composition, unsaturated polyester resins are preferred for reasons of cost, availability, clarity and ease of handling.

Polyester resins are exceedingly well known, and are described in standard plastics reference texts, such as "Modern Plastics Encyclopedia" McGraw-Hill Publications, New York, N.Y. as the polycondensation products of dicarboxylic acids with dihydric alcohols. Depending on the choice of raw materials and on how the resin is manufactured, polyesters can be formulated to meet any one of a wide range of special needs.

As mentioned above in addition to the unsaturated polyester resin, there may also be present ethylenically unsaturated monomers and the term polyester resin gelcoat as used herein, is meant to include the presence of such ethylenically unsaturated monomers. These monomers include, for example, alpha-methylstyrene, para-methylstyrene, divinylbenzene, methylmethacrylate, diallylphthalate, and the like. Also used with the polyester resin gelcoat is a polymerization catalyst or mixture of catalysts. Such catalysts are well recognized in the art and usually are based on an organic peroxide type compound such as, for example, methyl ethyl ketone peroxide, benzoyl peroxide, tertiary butyl hydroperoxide, and the like. Typically, the catalyst may be present in amounts ranging from about 0.1 to about 5 percent by weight of the polyester resin gelcoat.

The polyester resin gelcoat may also contain other promoters, anti-oxidants and the like. Preferably a flexibilizing agent is added such as an alkyd resin dissolved in styrene and other vinyl monomers. Such flexibilizing agents are marketed under brandnames such as Polylite Polyester Flex Resin by Reichold Chemicals, White Plains, N.Y. Other flexibilizing agents, such as disclosed in "Polyesters", Vol. 2, Parkyn et al, American Elsevier, 1967, are suitable and may be used. The agents, which provide advantageous features to the product for packaging, shipping, handling and installation purposes are preferred but not essential. As stated above, the purpose of the gelcoat is to provide a clear stain resistant film on the surface of the mold. Many types of gelcoats are available under such brandnames as Ferro NPG Gelcoat VT-12044, manufactured by the Ferro Corporation, Cleveland, Ohio.

As the gelcoat is applied, it begins to react to gel or crosslink such that an initially tacky film is formed on the mold 4. This curing or gelling step is preferably carried out at ambient conditions for approximately 20 minutes. Curing time can be decreased by the application of heat and/or the use of other promoters or catalysts.

Once the gelcoat 1 has reached a tacky consistency indicating at least partial crosslinking, another thermosetting resin coating is applied. This second coating is shown as layer 2. Layer 2 is laid on by hand, brushed or rolled. Preferably, the composition of layer 2 is a thermosetting polyester matrix resin and filler. Of course other additives such as flame retardants, e.g., alumina trihydrate, colorants, and the like are also within the scope of the present invention. When making synthetic marble or onyx products, casting of the second layer is the method-of-choice. The term "polyester matrix resin" is meant to include the homopolymers and copolymers of polyesters.

A wide variety of generally clear, transparent or translucent thermosetting polyester resins are available and are within the scope of the present invention. In the preferred embodiment, such resins are formed by the copolymerization of styrene and an unsaturated polyester formed by reacting an alpha, beta-unsaturated dicarboxylic acid with glycol. Resins of this type are disclosed in U.S. Pat. Nos. 2,255,313 and 3,396,067. Other unsaturated polyester resins within the scope of the present invention are those discussed in the Modern Plastics Encyclopedia as being the polycondensation product of a dicarboxylic acid with a dihydric alcohol. Examples of diacids include phthalic acid and isophthalic acid. Examples of the dihydric alcohol include ethylene glycol and propylene glycol. These types of unsaturated polyester resins are usually catalyzed with a peroxide such as those mentioned above with regards to gelcoat 1.

One example of a commercially available polyester matrix resin which meets the requirements of polyester matrix resin to be used in connection with layer 2 is Freeman Polyester Resin Stypol 40-5730, which is a styrene modified polyester.

It is usually advantageous to add additional liquid polymerizable monomer, such as styrene, to the unsaturated polyester, so as to make the unsaturated polyester resin more fluid and also to cross-link the resin at the time of curing. When a commercial polyester resin which contains such a vinyl monomer is used, it is often desirable to add additional monomer for fluidity and cross-linking advantages in accordance with prior art practices. Other liquid monomers mentioned with respect to gelcoat layer 1 can also be used in forming layer 2.

Plasticizers or flexibilizing agents are also added in this matrix layer and can also be the same used in gelcoat layer 1.

In a highly preferred embodiment of this invention a vast number of microspheres is dispersed throughout the entire matrix layer 2 to reduce weight and to significantly improve flexibility and impact resistance. These properties are improved since the microspheres serve to distribute stresses throughout the matrix of the polyester. The term "microspheres" as used herein refers to the hollow particles having a size from about 10 microns up to about 500 microns in diameter. The use of either frangible or rigid microspheres will achieve weight reduction. However, frangible microspheres contribute to the degree of flexibility and are therefore preferred. Either product can be used, however, depending upon the desired characteristics as determined by the finished product. Since microspheres within the range of 20 to 150 are readily available, these are most frequently employed. The most preferred "microspheres" are spherical, but other shapes such as tubular or pear are also useful. Microspheres of glass, phenolic resins, vinyl resins such as polyvinylidene chloride and polyolefin resins have been found to give excellent results. The glass spheres or bubbles are most preferred and may be fused water-insoluble alkali metal silicate based glass of the type shown in Veatch, U.S. Pat. No. 2,978,340, although most preferred are the glass spheres formed from a sode-lime-silica glass of the type generally used for glazing. These most preferred glass spheres are commercially available from the PQ Corporation, Valley Forge, PA under the designation Q-CEL #200.

In terms of the fillers which are used, the filler is preferably finely divided, in a size of 60 mesh or finer, and can be any one of the well recognized fillers used in the prior art including calcium carbonates, silica, glass frit, alumina trihydrate, glass flour, antimony oxide, quartz flour, onyx flour, talc, titanium dioxide and the like. A general criterion for the filler is that when homogeneously mixed into the matrix resin, it produce a product which is translucent. In this manner, a depth is given to the product which helps create the appearance of marble or onyx. Fillers having a refractive index similar to that of the polyester resin function in this manner.

It is preferred in the manufacture of bathroom and structural components, in order to achieve the degree of fire retardance required by building codes, that high loadings of fillers which impart such property to the final product may be employed. Fire retardance can be achieved through the use of one or more of the following: chlorendic anhydride, tetrabromophthalic anhydride, dibromoneo-pentyl glycol, antimony oxide, alumina trihydrate and organo phosphorous compounds.

Preferably, the polyester matrix resin is present in an amount of 15 to 50 weight percent and from 50 to 85 weight percent of the filler is used. In addition to the polyester matrix resin and filler, from 2 to 20 weight percent based on the total weight of the resin/filler, preferably 5 to 16 weight percent, of a solvent for the resin is added to the resin/filler mixture.

If the product is to be simulated marble or slate the selection of the filler would usually be either calcium carbonate or silica with a small amount of alumina trihydrate. In the case of marble, a base pigment is introduced into the mixture and uniformly mixed to make layer 2 conform to that specific base color. Then veining pigments or highlight colors are randomly mixed by swirling, folding or sprinkling, etc. If slate is desired, only one solid color pigment need be employed (except for combinations of pigments for shading purposes) and is uniformly mixed. If cultured onyx is desired the preferred filler would be alumina trihydrate, or glass frit with a small amount of alumina trihydrate.

The veins in marble may have a wide range of color. These veins in marble slabs are preferably formed from colorants of varying viscosity. Such colorants are commercially available. Coloring matter which is insoluble or slightly soluble in the polymerizable mixture is used to produce veining. The terms "pigment" as applied herein is used in the broad sense to include inorganic pigments which may be opaque, translucent and transparent and may be natural or synthetic. The term "dye" includes lakes, toners and organic and inorganic pigments.

After the mold 4 has been completely covered with layer 2 of the polyester matrix resin/filler mixture by hand casting, the appearance of veins or striations is introduced to the matrix mix, although these should be added separately and carefully so as not to disperse any of the striations. Other methods known for forming opaque or colored striation mix are also within the scope of this invention. These mixes do not penetrate through the gelcoat 1 and are restrict to layer 2. The composition of layer 2 may contain a thermosetting polyester resin and catalyst of the type hereinabove described with reference to gelcoat layer 1. The high percentage (50–85 weight percent) of filler and colorant, when randomly mixed can produce an infinite number of patterns in the form of veins or striations in layer 2. Other prior art methods for forming veins or striations can also be used. For example, the veins may be sprayed on the exposed surface of the layer 1 facing layer 2, using a splatter gun, or the like. Layer 2 is now permitted to partially cure. The second layer typically ranges from about 1.0 mm to about 13.0 mm, with a preferred range of about 2 mm to 6 mm, but may be thicker depending on the end use intended.

A third or backing layer 3 is applied after the layer 2 has reached a state of tackiness. This comprises a woven or nonwoven polyester fiber sheet impregnated with a thermosetting resin which may be pigmented or unpigmented, a plasticizer, and an associated catalyst. Additional inorganic fillers can be added, preferably in the form of fire retardant compositions. It is preferred that the polyester fiber sheet contains microspheres. Optionally the microspheres can be mixed with the impregnation resin. Other synthetic fibers or fabrics such as polyethylene or polypropylene woven or nonwoven fabric may also be used. It is critical that all air pockets between the matrix layer 2 and backing layer 3 are removed. Preferably, this is done by application of a roller pressure. A further advantage of rolling is uniform distribution of the thermosetting resin throughout the polyester fiber sheet.

It should be understood that the cross-section of the final product as shown in FIG. 1 is such that the thicknesses of layers 2 and 3 are approximately equal. Preferably, layers 2 and 3 are each about 2.5 mm thick, and gelcoat layer 1 is about 0.38 mm thick. This balanced sandwich-type construction for panels and sheets has been found to be particularly beneficial in that it prevents warpage and imparts superior flexibility characteristics to the sheet. The relative thickness of layers 2 and 3 will vary depending on the ultimate use of the simulated stone product. The thicknesses disclosed would by typical for use in lavatory products such as bathtub walls, shower stall walls, countertops, washbasins or other products that would be supported by support means other than itself, e.g., wall board, existing counter-tops, etc. If the product were to be laminated to another substrate, such as plywood, wallboard, particle board, etc., then the thickness could be still thinner. For example, layer 3 might be as thin as 1 mm if so laminated. On the other hand, however, if the product were used for structural members, architectural panels, columns and the like it could be made thicker to meet building codes.

The following example will illustrate a suitable reinforced plastics product for use in practicing the present invention.

EXAMPLE

A flat mold having dimensions of 75.80 cm × 151.60 cm and an upwardly extending rim of 5.08 cm was coated with a carnuba wax. Excess wax was removed and the surface buffed to obtain a high gloss on the mold surface. A gelcoat composition consisting of:

| Polyester resin | Ferro NPG Gelcoat VT-12044 | 512.75 grams |
|---|---|---|
| Plasticizer | Reichhold Polylite Polyester Flex Resin 31-851 | 14.00 grams |
| Catalyst | Methyl ethyl ketone peroxide | 10.75 grams | was prepared. The gelcoat composition was sprayed onto the mold surface using a Binks Maverick Airless Spray System until a gelcoat film of 0.38 mm was achieved. The gelcoat was allowed to set for 30 minutes.

A polyester matrix composition was prepared consisting of:

| Calcium carbonate | Wyoming ABC | 1884.00 grams |
|---|---|---|
| Alumina trihydrate | Solem SB-31 | 120.00 grams |
| Polyester resin | Freeman Resin Stypol 40-5730 | 959.00 grams |
| Plasticizer | Reichhold Polylite Polyester Flex 31-851 | 411.00 grams |
| Microspheres | Q-Cel 200 | 51.00 grams |
| Catalyst | MEK peroxide | 27.4 grams |
| Pigment/Polyester | | 10.0 grams |

The above polyester resin matrix was mixed in a mechanical mixer until the desired marble effect was obtained. The mixture was then poured by hand onto the inner side of the gelcoat layer and spread evenly with a straight edge. The thickness of the second layer was 2.38 mm. The polyester matrix was allowed to set up for 15 minutes.

A backing layer comprising a pre-cut piece the same size as the mold of nonwoven polyester fiber with microspheres marketed under the tradename Coremat P 2430-2 mm by FIRETbv of Holland distributed by West Point Pepperell, Fairfax, Ala., was impregnated with a mixture of:

| Polyester resin | Freeman Polyester Resin Stypol 40-5730 | 1694.5 grams |
|---|---|---|
| Plasticizer | Reichhold Polylite Polyester Flex Resin 31-851 | 726.0 grams |
| Fire retardant | Solem SB-31 | 160.0 grams |
| Pigment | Titanium dioxide | 10.0 grams |
| Catalyst | MEK peroxide Reichhold 771-01-055 | 48.4 grams |

The impregnated sheet was laid over the polyester-stone matrix and rolled with a fiberglass roller to remove all the air pockets between the matrix layer and backing layer and to impregnate uniformly the resin mixture into the backing sheet. The excess resin mixture was discarded. The backing layer was allowed to set up for an initial period of 15 minutes, then an additional 30 minutes was required for the entire system to cure. The completed panel was 4.348 mm thick and weighed 4,876.29 grams and was used as a component for a stall shower assembly.

In describing our process, it has been presented with respect to the use of polyester resins as the binding ingredient. However, it should be understood that the process may have application to other resin systems such as epoxy resins or acrylic resins such as polymethyl methacrylate. While the example discloses a batch process, it is contemplated that the process can be geared for continous operation.

The present invention is particularly adapted to the manufacture in their final forms a range normally made of natural stone (marble, onyx or slate). Particular interest is directed to the manufacture of bathroom components such as shower stalls and unitized tub wall segments. Products made by the present method and compositions provide a particularly appealing transparency in depth beyond the surface of the product and may include visibly embedded opaque or colored striations in close simulation of natural transparent materials.

It is believed to be clear from the foregoing descriptions and discussion that a novel improved product and production arrangement has been provided in accordance with the objects of the invention.

Although certain preferred embodiments of the invention have been described in detail in accordance with the patent law, many modifications and variations within the spirit of the invention will occur to those skilled in the art and all such are considered to fall within the scope of the following claims.

I claim:

1. A simulated stone composite formed of a reinforced plastic product comprising:
   (a) a gelcoat layer comprised of a thermoplastic or thermoset resin;
   (b) a resin matrix layer having dispersed therein fillers and colorants laid up on the inner side of said gelcoat layer; and
   (c) a backup layer comprised of a polyester fiber sheet which has been impregnated with thermoplastic or thermoset resin laid up on said matrix layer.

2. The product of claim 1 wherein said resin is selected from homopolymers of an ethylenically unsaturated polyester and copolymers of an ethylenically unsaturated polyester and an ethylenically unsaturated monomer.

3. The product of claim 2 wherein said ethylenically unsaturated monomer is selected from the group consisting of olefins, vinyl esters and epoxy resins.

4. The product of claim 1 wherein said matrix layer and said backup layer contain microspheres.

5. The product of claim 4 wherein said microspheres are present up to about 35 weight percent of the composite.

6. The product of claim 1 wherein said polyester fiber sheet is made of nonwoven fabric.

7. The product of claim 1 wherein said fillers are calcium carbonate, alumina trihydrate, silica and mixtures thereof.

8. The product of claim 1 wherein each of said layers (a), (b) and (c) contain plasticizers.

9. A simulated stone product formed in a thin, lightweight, flexible, resiliant, impact resistant, heat formable sheet comprising:
   (a) a gelcoat layer comprised of a thermoplastic or thermoset resin and plasticizer;
   (b) a thermoplastic or thermoset resin matrix having dispersed therein fillers, colorants and plasticizers laid up on the inner side of said gelcoat layer; and
   (c) a backup layer comprised of a polyester fiber sheet which has been impregnated with thermoplastic or thermoset resin and plasticizer laid up on the inner side of said matrix layer.

10. The product of claim 9 wherein said simulated stone is marble or onyx.

11. The product of claim 9 wherein said simulated stone is slate.

12. The product of claim 9 wherein layer (b) and layer (c) contain microspheres.

13. The product of claim 9 wherein said fillers are calcium carbonate, alumina trihydrate, silica and mixtures thereof.

14. The product of claim 1 in the form of a bathroom fixture.

15. A bathroom fixture formed of a simulated stone product comprising:
   (a) a gelcoat comprised of a thermoplastic or thermoset resin and plasticizer;
   (b) a thermoplastic or thermoset resin matrix having dispersed therein fillers, colorants and plasticizers laid up on the inner side of said gelcoat layer; and
   (c) a backup layer comprised of a polyester fiber sheet which has been impregnated with thermoplastic or thermoset resin and plasticizer laid up on the inner side of said matrix layer.

16. The product of claim 1 wherein said polyester fiber sheet is made of woven fibers.

17. A reinforced flexible plastic product comprising:
   (a) a gelcoat layer;
   (b) a resin matrix layer having dispersed therein fillers and colorants laid up on the inner side of said gelcoat layer; and
   (c) a backup layer comprised of a sheet of fibrous polyester material of woven or nonwoven fibers impregnated with thermoplastic or thermoset resin laid up on the inner side of said matrix layer.

18. A reinforced plastic product as recited in claim 17 wherein said polyester fibers are impregnated with polyester resin.

19. A simulated stone product comprising:
   (a) a gelcoat layer comprised of a resin and plasticizer;
   (b) a resin matrix layer having dispersed therein fillers, colorants and plasticizers laid up on the inner side of said gelcoat layer; and
   (c) a backup layer comprised of a sheet of fibrous polyester material of woven or nonwoven polyester fibers impregnated with polyester resin laid up on the inner side of said matrix layer.

* * * * *